G. BERGENDORF.
SUPPORT FOR MOTORS.
APPLICATION FILED MAR. 4, 1918.
1,353,986.
Patented Sept. 28, 1920.
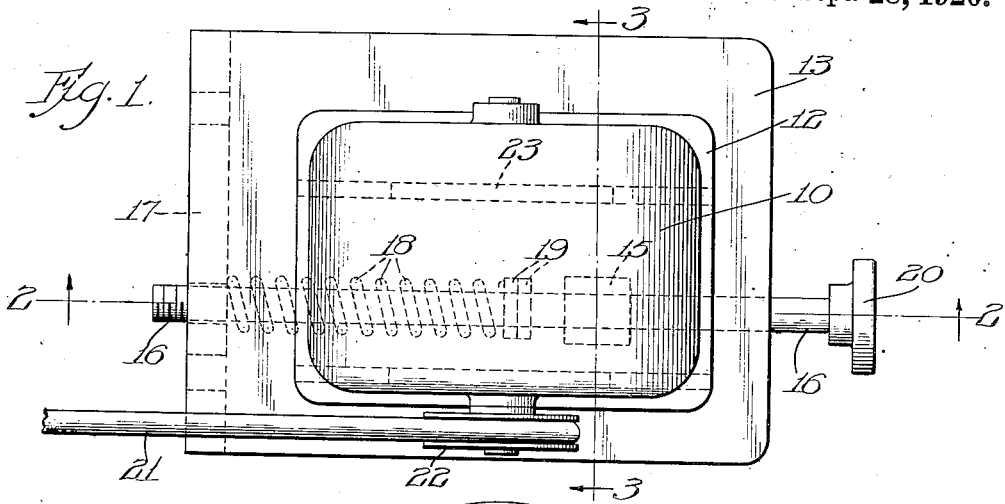
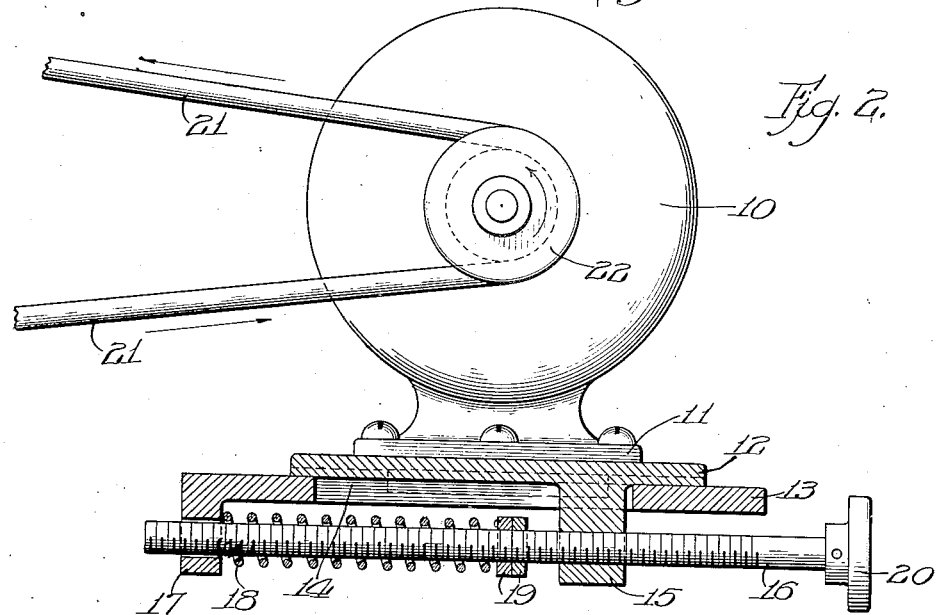
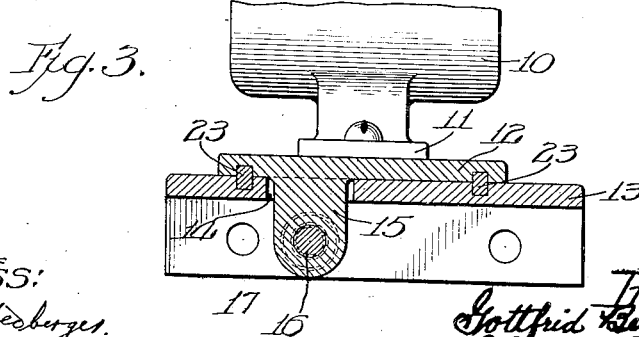
Witness:
Maurice Treeberger.
Inventor:
Gottfrid Bergendorf,
by Charles C. Bulkley
Atty.

UNITED STATES PATENT OFFICE.

GOTTFRID BERGENDORF, OF ROCK ISLAND, ILLINOIS, ASSIGNOR TO ROCK ISLAND PLOW COMPANY, OF ROCK ISLAND, ILLINOIS, A CORPORATION OF ILLINOIS.

SUPPORT FOR MOTORS.

1,353,986.  Specification of Letters Patent.  Patented Sept. 28, 1920.

Application filed March 4, 1918. Serial No. 220,220.

*To all whom it may concern:*

Be it known that I, GOTTFRID BERGENDORF, a citizen of the United States of America, and resident of Rock Island, Rock Island county, Illinois, have invented a certain new and useful Improvement in Supports for Motors, of which the following is a specification.

My invention relates to improvements in supports for motors—that is, to a spring-pressed yieldable mounting for a prime mover, in which a proper tension is maintained on the belt but movement of this prime mover is permitted to relieve against shocks or sudden increments of speed.

My invention is particularly adapted and useful in connection with cream separators where it is of importance that the separator be driven at a substantially constant and even rate of speed. By my invention any shocks or sudden increases of speed in the prime mover causes an increased tension on the belt, thereby moving the prime mover so as to relieve the tension of the belt to such an extent that the belt is permitted to slip on the pulley of the prime mover, and thus the shocks and sudden increments of speed are not transmitted to the driven pulley of the cream separator, but this pulley is maintained at a substantially constant rate of speed.

These and other features and objects of my invention will be more readily and clearly understood by having reference to the accompanying drawings, in which I have illustrated one embodiment of my invention.

Figure 1 is a plan view of an electric motor mounted on my improved support.

Fig. 2 is a sectional view taken on the line 2—2 of Fig. 1, the motor, however, being shown in elevation.

Fig. 3 is a detail sectional view taken on the line 3—3 of Fig. 1.

I have illustrated a prime mover, in the form of an electric motor 10, the base 11 of which is securely bolted to a plate 12. This plate 12 rests upon a suitable supporting member 13. This supporting member is provided with an elongated slot or opening 14 through which passes a downwardly extending lug 15 carried by the supporting plate 12. A threaded rod 16 passes through this lug 15 having threaded engagement therewith, the end of this rod likewise passing freely through a second lug 17 extending downward from the end of the supporting member 13. Surrounding this rod is a helical spring 18, this spring being mounted between the lug 15 and a pair of lock nuts 19 mounted on the rod 16. This rod 16 is provided with a suitable operating knob 20 so that it may be rotated so as to vary the tension of the spring 18. In this manner the force exerted against the lug 15 tending to slide the plate 12 on the member 13 against the tension of the belt 21, passing around the driving pulley 22, may be suitably adjusted to meet working conditions. Extending downward from the plate 12, there are one or more elongated guide lugs or keys 23 which engage with corresponding slots in the upper surface of the supporting member 13.

In operation, the tension of the spring 18 is suitably adjusted to give the proper tension on the belt 21,—that is, such a tension that during operation of the motor at normal driving speed, the adhesion of the belt is sufficient to prevent slipping. In case of any shocks, they will be absorbed by this spring, and in case of any sudden increments of speed in the driving pulley the motor support moves against the compression of the spring sufficiently to relieve the tension on the belt so as to permit the same to slip on the driving pulley. In this manner, the shocks and sudden increments of speed in the driving pulley are not transmitted to the driven member at the other end of the belt, but this member is maintained at a substantially constant and even rate of speed. In case at any time it is desired to increase the tension on the belt, it is merely necessary to rotate the rod 16 so as to further compress the spring 18, whereby it will exert a greater force in opposition to the pull of the belt.

By my construction, it will be seen that the motor or prime mover is firmly mounted on a flat supporting surface and held in alinement with the driven member by means of the keys or guides 23. Furthermore, any movement of the prime mover, due to the compression of the spring 18, does not in any way affect the stability of the mounting for the prime mover, nor tend in any way to throw the motor out of alinement with the driven member.

While I have illustrated and described one form of prime mover, it will be understood that my invention is equally as adaptable for use with other forms of prime movers, my invention residing in the supporting means for the same. Other changes and modifications may suggest themselves to those skilled in the art without departing from the spirit of my invention.

What I claim as my invention is:

1. In a device of the class described, a prime mover carrying a driving pulley, a belt passing around said pulley, a plate secured to said prime mover and supporting the weight of said prime mover, a flat supporting member on which said plate is adapted to slide, due to the pull exerted by said driving belt, a downwardly extending lug carried by said plate and passing through a slot in said supporting member, a threaded rod passing through said lug, and a spiral spring surrounding said rod and operating to resist movement of said prime mover due to the pull by the belt.

2. In a device of the class described, a prime mover carrying a driving pulley, a belt passing around said pulley, a plate secured to said prime mover and supporting the weight of said prime mover, a flat supporting member on which said plate is adapted to slide, due to the pull exerted by said driving belt, a downwardly extending lug carried by said plate and passing through a slot in said supporting member, a threaded rod passing through said lug, a spiral spring surrounding said rod and operating to resist movement of said prime mover due to the pull by the belt, and means for adjusting the tension on said spring to thereby vary the resisting force exerted thereby.

3. In a device of the class described, a prime mover, a driving pulley, a driving belt passing around the same, a base plate secured to said prime mover, a flat supporting member on which said base plate is adapted to slide, one or more lugs projecting downward from said base plate and engaging with corresponding slots in said supporting member to guide the relative movement between said member, an elongated opening in said supporting member, a downwardly projecting lug on said base plate passing through said opening, a threaded rod passing through said lug and loosely through a depending section of said supporting member, and a compression spring mounted on said rod operating to resist the sliding movement of said prime mover on said supporting member due to the tension exerted by said belt.

4. In a device of the class described, a prime mover, a driving pulley, a driving belt passing around the same, a base plate secured to said prime mover, a flat supporting member on which said base plate is adapted to slide, one or more lugs projecting downward from said base plate and engaging with corresponding slots in said supporting member to guide the relative movement between said members, an elongated opening in said supporting member, a downwardly projecting lug on said base plate passing through said opening, a threaded rod passing through said last-mentioned lug and loosely through a depending section of said supporting member, a compression spring mounted on said rod operating to resist the sliding movement of said prime mover on said supporting member due to the tension exerted by said belt, and means for varying the tension on said spring to thereby vary the compressive force exerted thereby.

Signed by me at Rock Island, Illinois, this 21 day of February, 1918.

GOTTFRID BERGENDORF.